United States Patent
Tokimune et al.

(10) Patent No.: US 10,550,247 B2
(45) Date of Patent: Feb. 4, 2020

(54) RUBBER COMPOSITION FOR TIRES, AND PNEUMATIC TIRE

(71) Applicant: SUMITOMO RUBBER INDUSTRIES, LTD., Kobe-shi, Hyogo (JP)

(72) Inventors: Ryuichi Tokimune, Kobe (JP); Naoya Kitamura, Kobe (JP); Kouji Kawaguchi, Kyoto (JP); Naoya Hashimoto, Kyoto (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 259 days.

(21) Appl. No.: 15/526,430

(22) PCT Filed: Nov. 27, 2015

(86) PCT No.: PCT/JP2015/083327
§ 371 (c)(1),
(2) Date: May 12, 2017

(87) PCT Pub. No.: WO2016/084925
PCT Pub. Date: Jun. 2, 2016

(65) Prior Publication Data
US 2018/0258260 A1     Sep. 13, 2018

(30) Foreign Application Priority Data

Nov. 28, 2014  (JP) ................. 2014-241873

(51) Int. Cl.
*C08L 7/00* (2006.01)
*C08L 9/00* (2006.01)
*B60C 1/00* (2006.01)

(52) U.S. Cl.
CPC .............. *C08L 9/00* (2013.01); *B60C 1/0025* (2013.01); *C08L 7/00* (2013.01); *B60C 2001/005* (2013.01); *C08L 2201/08* (2013.01); *C08L 2205/02* (2013.01); *C08L 2205/025* (2013.01); *C08L 2205/03* (2013.01); *C08L 2205/035* (2013.01)

(58) Field of Classification Search
CPC ........... B60C 1/00; B60C 1/0025; C08K 3/04; C08L 9/00; C08L 7/00; C08L 23/16; C08L 71/02

See application file for complete search history.

(56) References Cited

U.S. PATENT DOCUMENTS

| 6,140,450 A | 10/2000 | Ishikawa et al. |
| 2003/0004249 A1 | 1/2003 | Yagi et al. |
| 2010/0076118 A1* | 3/2010 | Yano ................... B60C 1/00 523/351 |
| 2014/0100321 A1 | 4/2014 | Maejima et al. |

FOREIGN PATENT DOCUMENTS

| JP | 5-194790 A | 8/1993 |
| JP | 11-106512 A | 4/1999 |
| JP | 2000-239445 A | 9/2000 |
| JP | 2003-128839 A | 5/2003 |
| JP | 2013-10967 A | 1/2013 |
| JP | 4-272944 A | 4/2014 |
| JP | 2014-62168 A | 4/2014 |

OTHER PUBLICATIONS

International Search Report for PCT/JP2015/083327 (PCT/ISA/210) dated Mar. 1, 2016.
Written Opinion of the International Searching Authority for PCT/JP2015/083327 (PCT/ISA/237) dated Mar. 1, 2016.
Machine English translation of JP 2000-239445 A (Sep. 5, 2000).
Machine English translation of JP 2014-62168 A (Apr. 10, 2014).
Machine English translation of JP 4-272944 A (Sep. 29, 1992).

* cited by examiner

*Primary Examiner* — Peter D. Mulcahy
(74) *Attorney, Agent, or Firm* — Birch, Stewart, Kolasch & Birch, LLP (57) ABSTRACT

The present invention provides a rubber composition for tires which can improve crack resistance, ozone resistance, discoloration resistance, and tire appearance while maintaining a good balance between them, and also provides a pneumatic tire formed from the rubber composition. The present invention relates to a rubber composition for tires, containing a rubber component having a combined content of polybutadiene rubber, natural rubber, and polyisoprene rubber of 80% by mass or more per 100% by mass of the rubber component, the rubber composition containing, per 100 parts by mass of the rubber component: 0.1 to 8.0 parts by mass of polyether (A) having a glycol ether content of 80% by mass or more and a HLB of 3.5 to 19.0, the polyether (A) excluding Pluronic nonionic surfactants; 2 to 70 parts by mass of carbon black; and 0.3 to 7.0 parts by mass of an antioxidant.

8 Claims, 1 Drawing Sheet

HO—(PO)₄₀—Bu (wherein PO represents propylene oxide, and Bu represents a butyl group.)

RUBBER COMPOSITION FOR TIRES, AND PNEUMATIC TIRE

TECHNICAL FIELD

The present invention relates to a rubber composition for tires and a pneumatic tire formed from the rubber composition.

BACKGROUND ART

Automobile tires, which are formed from rubber compositions containing natural rubber and synthetic diene rubbers as raw materials, can be degraded in the presence of ozone and eventually cracked. In order to reduce formation and growth of cracks in the presence of ozone, the rubber compositions contain additives, including, for example, antioxidants such as N-(1,3-dimethylbutyl)-N'-phenyl-p-phenylenediamine (6PPD) or poly(2,2,4-trimethyl-1,2-) dihydroquinoline (TMDQ), and petroleum-derived waxes.

The antioxidants and petroleum-derived waxes in rubber vulcanizates migrate (bloom) to the rubber surface of e.g. tires, thereby protecting the rubber from ozone. However, excessive blooming of the antioxidants and petroleum-derived waxes in short periods of time causes white discoloration. Moreover, the antioxidants degraded by ozone cause brown discoloration and similarly can excessively bloom, resulting in a more intense brown discoloration. In addition, if the waxes and other agents bloomed to the surface of a tire form surface irregularities, diffused reflection of light will occur, with the result that the brown discoloration caused by the degraded antioxidants may be more noticeable, and moreover the tire will lose its shine.

Patent Literature 1 discloses the incorporation of a polyoxyethylene ether nonionic surfactant to prevent deterioration of tire appearance. Nevertheless, there is room for improvement in terms of balanced improvement in crack resistance, ozone resistance, discoloration resistance, and tire appearance.

CITATION LIST

Patent Literature

Patent Literature 1: JP H05-194790 A

SUMMARY OF INVENTION

Technical Problem

The present invention aims to solve the above problems and provide a rubber composition for tires that can improve crack resistance, ozone resistance, discoloration resistance, and tire appearance while maintaining a good balance between them, and also provide a pneumatic tire formed from the rubber composition.

Solution to Problem

The present invention relates to a rubber composition for tires, containing a rubber component having a combined content of polybutadiene rubber, natural rubber, and polyisoprene rubber of 80% by mass or more per 100% by mass of the rubber component, the rubber composition containing, per 100 parts by mass of the rubber component: 0.1 to 8.0 parts by mass of polyether (A) having a glycol ether content of 80% by mass or more and a HLB of 3.5 to 19.0, the polyether (A) excluding Pluronic nonionic surfactants; 2 to 70 parts by mass of carbon black; and 0.3 to 7.0 parts by mass of an antioxidant.

The polyether (A) preferably has a number average molecular weight of 1,500 to 50,000, more preferably of 2,000 to 40,000.

The polyether (A) preferably has a HLB of 4.0 to 17.5.

The present invention also relates to a pneumatic tire, including a tire component formed from the rubber composition.

The tire component is preferably at least one of a sidewall, clinch, or wing.

Advantageous Effects of Invention

The present invention provides a rubber composition for tires, containing a rubber component having a combined content of polybutadiene rubber, natural rubber, and polyisoprene rubber of 80% by mass or more per 100% by mass of the rubber component, wherein the rubber composition contains, per 100 parts by mass of the rubber component: 0.1 to 8.0 parts by mass of polyether (A) having a glycol ether content of 80% by mass or more and a HLB of 3.5 to 19.0 (excluding Pluronic nonionic surfactants); 2 to 70 parts by mass of carbon black; and 0.3 to 7.0 parts by mass of an antioxidant. Such a rubber composition can improve crack resistance, ozone resistance, discoloration resistance, and tire appearance while maintaining a good balance between them, and therefore can be used to produce a pneumatic tire excellent in the balance of these properties.

DESCRIPTION OF EMBODIMENTS

The rubber composition for tires of the present invention contains a rubber component having a combined content of polybutadiene rubber, natural rubber, and polyisoprene rubber of 80% by mass or more per 100% by mass of the rubber component. The rubber composition contains, per 100 parts by mass of the rubber component: 0.1 to 8.0 parts by mass of polyether (A) having a glycol ether content of 80% by mass or more and a HLB of 3.5 to 19.0 (excluding Pluronic nonionic surfactants); 2 to 70 parts by mass of carbon black; and 0.3 to 7.0 parts by mass of an antioxidant.

In the present invention, by incorporating a specific amount of a certain polyether into a rubber composition containing a specific rubber component and specific amounts of carbon black and an antioxidant, the irregularities formed on the tire surface (bloom layer) by blooming of waxes and other agents can be flattened to reduce diffused reflection of light. This also results in improved discoloration resistance, such as decreases in the brown discoloration and white discoloration described above. Furthermore, excellent tire appearance is obtained, such as appropriate black appearance and shine imparted to the tire surface. At the same time, good crack resistance and good ozone resistance are achieved. Accordingly, crack resistance, ozone resistance, discoloration resistance, and tire appearance can be improved while maintaining a good balance between them.

Further, probably since the rubber composition contains a certain polyether, the compatibility of the rubber composition with the certain nonionic surfactant is appropriately controlled, thereby leading to a balanced improvement in crack resistance, ozone resistance, discoloration resistance, and tire appearance as described above.

The rubber composition of the present invention contains at least one rubber selected from the group consisting of polybutadiene rubber (BR), natural rubber (NR), and polyisoprene rubber (IR). These rubbers may be used alone, or two or more of these may be used in combination. For a good balance between reinforcement and crack growth resistance, a combination of BR with NR and/or IR is more preferred.

The NR may be, for example, one usually used in the tire industry, such as SIR20, RSS #3, or TSR20. Any IR may be used, including those usually used in the tire industry. These rubbers may be used alone, or two or more of these may be used in combination.

The combined content of NR and IR per 100% by mass of the rubber component is preferably 30% by mass or more, more preferably 40% by mass or more. When it is less than 30% by mass, sufficient reinforcement or processability may not be ensured. The combined content of NR and IR is preferably 80% by mass or less, more preferably 70% by mass or less. When it is more than 80% by mass, sufficient crack growth resistance may not be ensured.

Any BR may be used, and examples include high-cis BR such as BR730 and BR51 both available from JSR Corporation, BR1220 available from Zeon Corporation, and BR130B, BR150B, and BR710 all available from Ube Industries, Ltd.; low-cis BR such as BR1250H available from Zeon Corporation; and BR containing 1,2-syndiotactic polybutadiene crystals (SPB) (SPB-containing BR) such as VCR412 and VCR617 both available from Ube Industries, Ltd. These rubbers may be used alone, or two or more of these may be used in combination.

In the case of the rubber composition containing BR, the content of BR per 100% by mass of the rubber component is preferably 10% by mass or more, more preferably 20% by mass or more. When it is less than 10% by mass, sufficient abrasion resistance or crack growth resistance may not be ensured. The content of BR is preferably 70% by mass or less, more preferably 65% by mass or less. When it is more than 70% by mass, reinforcement or handling stability may not be ensured.

SBR-containing BR can be used, for example, to impart reinforcement and fuel economy. In the case of the rubber composition containing SBR-containing BR, the 1,2-syndiotactic polybutadiene crystal content is preferably 5% by mass or more, more preferably 8% by mass or more. When it is less than 5% by mass, insufficient reinforcement and fuel economy may be imparted. The 1,2-syndiotactic polybutadiene crystal content is also preferably 22% by mass or less, more preferably 18% by mass or less. When it is more than 22% by mass, the SPB-containing BR may be too hard, thereby causing poor dispersion of rubber.

In the rubber composition of the present invention, the combined content of polybutadiene rubber, natural rubber, and polyisoprene rubber (preferably the combined content of polybutadiene rubber and natural rubber) per 100% by mass of the rubber component is 80% by mass or more, preferably 90% by mass or more, and may be 100% by mass. If it is less than 80% by mass, reinforcement, abrasion resistance, or crack growth resistance may not be ensured.

In addition to BR, NR, and IR, the rubber component may include any other rubber material. Examples include diene rubbers such as styrene-butadiene rubber (SBR), styrene-isoprene-butadiene rubber (SIBR), chloroprene rubber (CR), acrylonitrile butadiene rubber (NBR), ethylene-propylene-diene rubber (EPDM), butyl rubber (IIR), and halogenated butyl rubber (X-IIR). For example, SBR may be used to ensure reversion resistance and reinforcement. EPDM, butyl rubber, and/or halogenated butyl rubber may be used to impart weather resistance. These rubber materials may be used alone, or two or more of these may be used in combination.

The rubber composition of the present invention contains polyether (A).

The polyether (A) preferably has a HLB of 3.5 or higher, more preferably 4.0 or higher. The HLB of polyether (A) is preferably 19.0 or lower, more preferably 17.5 or lower, still more preferably 15.0 or lower. Polyether (A) having a HLB of lower than 3.5 or higher than 19.0 has lower compatibility with the above-described rubber and thus blooms at a faster rate, with the result that there is a high tendency for deterioration in tire appearance.

The term "HLB" refers to a measure used to determine hydrophilicity and hydrophobicity of nonionic surfactants. HLB as used herein is calculated by the Oda's method, not by the Griffin's method. The Oda's method is described, for example, in Takehiko Fujimoto, Introduction to Surfactants, Sanyo Chemical Industries, Ltd., 2007, p. 212.

HLB can be calculated from the ratio of the organic and inorganic values shown in the table on p. 213 of the book "Introduction to Surfactants".

$$HLB \approx 10 \times \text{inorganic value/organic value}$$

The glycol ether content per 100% by mass of polyether (A) is preferably 80% by mass or more, more preferably 83% by mass or more, still more preferably 85% by mass or more. When it is less than 80% by mass, sufficient discoloration resistance may not be ensured. The upper limit of the glycol ether content is not particularly limited and may be 100% by mass.

In the present invention, the glycol ether content (the proportion of the glycol ether component) refers to the combined amount of glycolic hydroxyl groups (—OH) and alkylene oxide moieties (e.g. ethylene oxide (EO), propylene oxide (PO)) in polyether (A).

Figure 1:
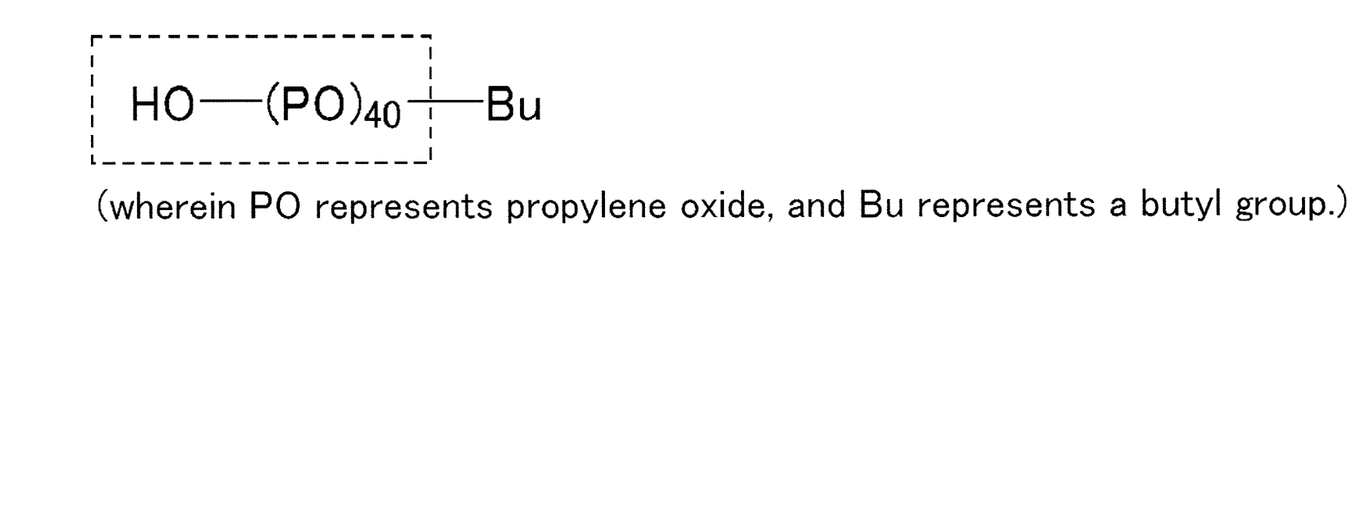
The drawing shows the glycol ether content of polyoxypropylene butyl ether, where the glycol ether content is shown in the enclosed portion.

For example, the glycol ether content of polyoxypropylene butyl ether represented by the drawing is the amount (content) of the enclosed portion in the compound, i.e. the combined amount (combined content) of —OH and —(PO)$_{40}$—.

The polyether (A) preferably has a number average molecular weight (relative to styrene standards) of 300 or more, more preferably 1,500 or more, still more preferably 2,000 or more. Polyether (A) having a number average molecular weight of less than 300 may migrate to the rubber surface at too fast a rate (bloom rate), causing some problems, such as sticky rubber surface, excessive gloss, or poor appearance. The number average molecular weight (relative to styrene standards) of polyether (A) is also preferably 50,000 or less, more preferably 40,000 or less, still more preferably 20,000 or less. Polyether (A) having a number average molecular weight of more than 50,000 may migrate to the rubber surface at too slow a rate, with the result that the irregularities on the tire surface are less likely to be flattened, and therefore the effect of improving tire appearance cannot be achieved.

The polyether (A) preferably contains one or more hydroxyl groups, more preferably two or more hydroxyl groups. Polyether (A) containing no hydroxyl group tends to have a smaller effect in improving tire appearance.

Polyether (A) is represented by $R^1$—O—$(R^2$—O$)_n$—$R^3$ or $R^4$—$\{$O—$(R^2$—O$)_n$—$R^1\}_m$, where $R^1$ and $R^3$ each represent a hydrogen atom or a C1-C20 aliphatic hydrocarbon, alicyclic hydrocarbon, aromatic hydrocarbon, or alkanoyl group in which a hydrogen atom bound to a carbon atom may be replaced with an aromatic hydrocarbon group; each $R^2$ is the same as or different from each other and represents a C2-C10 divalent aliphatic hydrocarbon or divalent alicyclic hydrocarbon group in which a hydrogen atom bound to a carbon atom may be replaced with an aromatic hydrocarbon group; $R^4$ represents a residue that is compound (a) having three or more hydroxyl groups from which the hydroxyl groups are removed; and n and m represent integers which are not limited as long as the HLB and the glycol ether content fall within the respective ranges indicated above.

Non-limiting examples of $R^1$ and $R^3$ include methyl, ethyl, propyl, butyl, pentyl, hexyl, octyl, stearyl, oleyl, cyclohexyl, adamanthyl, phenyl, toluyl, naphthyl, pyridyl, acetyl, propanoyl, butanoyl, hexynoyl, octynoyl, octadecanoyl, oleoyl, and benzoyl groups.

Non-limiting examples of $R^2$ include ethylene, propane-1,2-diyl, butane-1,2-diyl, (2-methyl)propane-1,2-diyl, hexane-1,2-diyl, octane-1,2-diyl, (1-phenyl)ethane-1,2-diyl, (1-phenyl)propane-1,2-diyl, cyclohexane-1,2-diyl, and cyclooctane-1,2-diyl groups.

Non-limiting examples of compound (a) having three or more hydroxyl groups include glycerol, diglycerol, polyglycerol, monosaccharides, polysaccharides, trimethylolpropane, and pentaerythritol.

Specific examples of polyether (A) include polyalkylene glycols obtained by homopolymerization or copolymerization of oxirane compounds such as ethylene oxide, propylene oxide, 1,2-butylene oxide, 2,3-butylene oxide, 2-methylpropylene oxide, or cyclohexene oxide; compounds obtained by replacing the hydrogen atoms of the hydroxyl groups in the foregoing polyalkylene glycols with alkyl groups (e.g., polyoxyalkylene alkyl ethers, polyoxyalkylene dialkyl ethers); compounds obtained by dehydration reactions of the hydroxyl groups in the foregoing polyalkylene glycols with organic acids; and alkylene oxide adducts of polyhydric alcohols.

The amount of polyether (A) per 100 parts by mass of the rubber component is 0.1 parts by mass or more, preferably 0.3 parts by mass or more, more preferably 0.6 parts by mass or more. If it is less than 0.1 parts by mass, too small an amount of polyether (A) will migrate to the rubber surface, and therefore the effect of improving tire appearance may not be achieved. The amount of polyether (A) is also preferably 8.0 parts by mass or less, more preferably 5.0 parts by mass or less, still more preferably 3.0 parts by mass or less. When it is more than 8.0 parts by mass, the polyether may migrate to the rubber surface at too high a rate (bloom rate), causing problems such as poor appearance.

A specific amount of carbon black is used in the present invention. This provides good reinforcement, resulting in good handling stability, crack resistance, and ozone resistance.

Specifically, the amount of carbon black per 100 parts by mass of the rubber component is 2 parts by mass or more, more preferably 15 parts by mass or more, still more preferably 25 parts by mass or more. An amount of less than 2 parts by mass may not provide sufficient reinforcement. The amount of carbon black is 70 parts by mass or less, preferably 65 parts by mass or less, more preferably 60 parts by mass or less. If it is more than 70 parts by mass, fuel economy tends to deteriorate, and in addition, the amount of polyether (A) adsorbed to carbon black will increase, which in turn reduces the amount of polyether (A) migrating to the rubber surface, with the result that the effect of improving tire appearance may not be achieved.

Non-limiting examples of carbon black include GPF, FEF, HAF, ISAF, and SAF. These materials may be used alone, or two or more of these may be used in combination.

The carbon black preferably has a nitrogen adsorption specific surface area ($N_2SA$) of 20 m$^2$/g or more, more preferably 50 m$^2$/g or more. Carbon black having a $N_2SA$ of less than 20 m$^2$/g may not provide sufficient reinforcement. The $N_2SA$ is preferably 180 m$^2$/g or less, more preferably 120 m$^2$/g or less, still more preferably 90 m$^2$/g or less, particularly preferably 80 m$^2$/g or less. When it is more than 180 m$^2$/g, processability may deteriorate, and in addition, the amount of polyether (A) adsorbed to carbon black will increase, and therefore the effect of improving tire appearance may not be achieved. The $N_2SA$ of the carbon black is determined in conformity with JIS K 6217-2:2001.

The carbon black preferably has a dibutyl phthalate oil absorption (DBP) of 50 mL/100 g or more, more preferably 80 mL/100 g or more. Carbon black having a DBP of less than 50 mL/100 g may not provide sufficient reinforcement. The DBP of the carbon black is also preferably 200 mL/100 g or less, more preferably 135 mL/100 g or less, still more preferably 115 mL/100 g or less. When it is more than 200 mL/100 g, processability may deteriorate, and in addition, the amount of polyether (A) adsorbed to carbon black will increase, and therefore the effect of improving tire appearance may not be achieved. The DBP of the carbon black is determined in conformity with JIS K 6217-4:2001.

In the present invention, silica may be used together with a specific amount of carbon black. The incorporation of silica can further improve tire appearance. Non-limiting examples of silica include dry silica (anhydrous silicic acid) and wet silica (hydrous silicic acid). These materials may be used alone, or two or more of these may be used in combination. Preferred among these is wet silica because it has a larger effect in simultaneously achieving fracture resistance and wet grip performance.

The silica preferably has a nitrogen adsorption specific surface area ($N_2SA$) of 50 m$^2$/g or more, more preferably 100 m$^2$/g or more, still more preferably 150 m$^2$/g or more. Silica having a $N_2SA$ of less than 50 m$^2$/g may not provide sufficient reinforcement. The $N_2SA$ is preferably 250 m$^2$/g or less, more preferably 210 m$^2$/g or less. When it is more than 250 m$^2$/g, processability may deteriorate, and in addition, the amount of polyether (A) adsorbed to silica will increase, and therefore the effect of improving tire appearance may not be achieved. The $N_2SA$ of the silica is determined according to the BET method specified in ASTM D3037-93.

In the case of the rubber composition containing silica, the amount of silica per 100 parts by mass of the rubber component is preferably 3 parts by mass or more, more preferably 10 parts by mass or more, still more preferably 20 parts by mass or more. The amount of silica is also preferably 40 parts by mass or less. When the amount of silica is more than 40 parts by mass, the amount of polyether (A) adsorbed to silica will increase, and therefore the effect of improving tire appearance may not be achieved.

In the case of the rubber composition of the present invention containing silica, it preferably contains a silane coupling agent together with the silica.

Any silane coupling agent may be used which is conventionally used in combination with silica in the rubber industry. Examples include sulfide silane coupling agents such as bis (3-triethoxysilylpropyl) disulfide; mercapto silane coupling agents such as 3-mercaptopropyltrimethoxysilane; vinyl silane coupling agents such as vinyltriethoxysilane; amino silane coupling agents such as 3-aminopropyltriethoxy-silane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone, or two or more of these may be used in combination. Among these, sulfide silane coupling agents are preferred, with bis(3-triethoxysilylpropyl)disulfide being more preferred.

In the case of the rubber composition containing a silane coupling agent, the amount of the silane coupling agent per 100 parts by mass of silica is preferably 2 parts by mass or more, more preferably 5 parts by mass or more. Less than 2 parts by mass of the silane coupling agent may not have a sufficient reinforcing effect. The amount of the silane coupling agent is also preferably 20 parts by mass or less, more preferably 12 parts by mass or less. An amount of more than 20 parts by mass tends not to have a reinforcing effect commensurate with the increase in cost.

A vulcanizing agent is used in the present invention in order to form crosslinks between polymer chains. Examples of the vulcanizing agent include those commonly used in the rubber industry, such as powdered sulfur, precipitated sulfur, colloidal sulfur, insoluble sulfur, highly dispersible sulfur, soluble sulfur, and alkylphenol-sulfur chloride condensates. These vulcanizing agents may be used alone, or two or more of these may be used in combination.

When the vulcanizing agent is sulfur, the amount of sulfur per 100 parts by mass of the rubber component is preferably 0.1 parts by mass or more, more preferably 0.5 parts by mass or more, still more preferably 1.0 part by mass or more. An amount of less than 0.1 parts by mass may not have a sufficient reinforcing effect. The amount of sulfur is preferably 6.0 parts by mass or less, more preferably 5.0 parts by mass or less, still more preferably 4.0 parts by mass or less, particularly preferably 3.0 parts by mass or less. An amount of more than 6.0 parts by mass may make the rubber excessively hard.

A wax is preferably incorporated in the present invention in order to reduce the formation and growth of cracks due to ozone. In the present invention, even when a wax is incorporated, the irregularities formed on the tire surface (bloom layer) by blooming of waxes and other agents can be flattened to reduce diffused reflection of light. This results in decreases in the brown discoloration and white discoloration described earlier. Furthermore, improved tire appearance is obtained, such as appropriate black appearance and shine imparted to the tire surface.

Non-limiting examples of the wax include petroleum-derived waxes and natural waxes. Synthetic waxes obtained by purification or chemical treatment of a plurality of waxes may also be used. These waxes may be used alone, or two or more of these may be used in combination.

Examples of petroleum-derived waxes include paraffin wax and microcrystalline wax. The natural wax may be any wax derived from non-petroleum resources, including, for example: vegetable waxes such as candelilla wax, carnauba wax, Japan wax, rice wax, and jojoba wax; animal waxes such as beeswax, lanolin, and spermaceti; mineral waxes such as ozokerite, ceresin, and petrolatum; and purified products of the foregoing waxes.

In the case of the rubber composition containing a wax, the amount of the wax per 100 parts by mass of the rubber component is preferably 0.5 parts by mass or more, more preferably 1.0 part by mass or more. An amount of less than 0.5 parts by mass may not provide sufficient ozone resistance. The amount of the wax is also preferably 12 parts by mass or less, more preferably 10 parts by mass or less, still more preferably 5.0 parts by mass or less. An amount exceeding 12 parts by mass may not be expected to have a larger effect in improving ozone resistance, but may increase the cost.

The rubber composition of the present invention may contain an oil. The incorporation of an oil improves processability and provides flexibility to tires, thereby allowing the effects of the present invention to be better achieved. Examples of the oil include process oils, vegetable oils and fats, and mixtures thereof. Examples of process oils include paraffinic process oils, aromatic process oils, and naphthenic process oils. Specific examples of paraffinic process oils include PW-32, PW-90, PW-150, and PS-32 all available from Idemitsu Kosan Co., Ltd. Specific examples of aromatic process oils include AC-12, AC-460, AH-16, AH-24, and AH-58 all available from Idemitsu Kosan Co., Ltd. Examples of vegetable oils and fats include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These oils may be used alone, or two or more of these may be used in combination.

In the case of the rubber composition containing an oil, the lower limit of the amount of the oil is not limited, and is preferably 60 parts by mass or less, more preferably 30 parts by mass or less, still more preferably 15 parts by mass or less, particularly preferably 10 parts by mass or less per 100 parts by mass of the rubber component. When the amount of the oil, which itself blooms to the tire surface, is within the range indicated above, blooming of polyether (A) can be suitably controlled, and therefore the effects of the present invention can be more suitably achieved.

The rubber composition of the present invention contains an antioxidant to reduce the formation and growth of cracks due to ozone. As described earlier, the present invention can reduce brown discoloration and white discoloration caused by the incorporation of antioxidants or other similar agents and thus can improve discoloration resistance and tire appearance.

Non-limiting examples of the antioxidant include naphthylamine antioxidants, quinoline antioxidants, diphenylamine antioxidants, p-phenylenediamine antioxidants, hydroquinone derivatives, phenol (monophenol, bisphenol, trisphenol, or polyphenol) antioxidants, thiobisphenol antioxidants, benzoimidazole antioxidants, thiourea antioxidants, phosphite antioxidants, and organic thioacid antioxidants. These antioxidants may be used alone, or two or more of these may be used in combination. Among these, p-phenylenediamine antioxidants are preferred because they provide good ozone resistance and allow the effects of the present invention to be more suitably achieved.

Examples of p-phenylenediamine antioxidants include N-(1,3-dimethylbutyl)-N'-phenyl-p-phenylenediamine, N-isopropyl-N'-phenyl-p-phenylenediamine, N-1,4-dimethylpentyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamines, hindered diaryl-p-phenylenediamines, phenylhexyl-p-phenylenediamine, and phenyloctyl-p-phenylenediamine. These antioxidants may be used alone, or two or more of these may be used in combination. Among these, N-(1,3-dimethylbutyl)-N'-phenyl-p-phenylenediamine is more preferred because it provides good ozone resistance and is also excellent in cost efficiency.

In the rubber composition, the amount of the antioxidant per 100 parts by mass of the rubber component is preferably 0.3 parts by mass or more, more preferably 0.5 parts by mass or more, still more preferably 1.0 part by mass or more. An amount of less than 0.3 parts by mass may not provide sufficient ozone resistance, and also is less likely to cause brown discoloration, with the result that the effects of the present invention are less likely to be achieved. The amount of the antioxidant is preferably 7.0 parts by mass or less, more preferably 6.0 parts by mass or less. When it is more than 7.0 parts by mass, a larger amount of the antioxidant may bloom and thereby deteriorate tire appearance, especially during initial use.

The rubber composition of the present invention preferably contains a vulcanization accelerator. Any type of vulcanization accelerator may be used including usually used ones. Examples of the vulcanization accelerator include sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. These vulcanization accelerators may be used alone, or two or more of these may be used in combination.

Examples of sulfenamide vulcanization accelerators include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). These may be used alone or in combinations of two or more.

In the case of the rubber composition containing a vulcanization accelerator, the amount of the vulcanization accelerator is not particularly limited and may be freely determined depending on the desired cure rate or crosslink density.

In addition to the above-described components, the rubber composition of the present invention may appropriately contain other compounding agents usually used to prepare rubber compositions, such as zinc oxide, stearic acid, or tackifiers.

The rubber composition of the present invention can be prepared by any known method, such as by kneading the above components using a rubber kneading machine such as an open roll mill or Banbury mixer, followed by vulcanization.

The rubber composition of the present invention can be suitably used in tire components, especially, for example, sidewalls, clinches, and/or wings which form tire (outer) surfaces requiring good ozone resistance, discoloration resistance, and tire appearance.

A sidewall refers to a component located outside a carcass and extending from a shoulder portion to a bead portion. Specifically, it is a component as shown in, for example, FIG. 1 of JP 2005-280612 A and FIG. 1 of JP 2000-185529 A.

A clinch refers to a rubber portion located at a lower part of a sidewall and covering a portion to be in contact with a rim, and is also called a clinch apex or a rubber chafer. Specifically, it is a component as shown in, for example, FIG. 1 of JP 2008-75066 A.

Awing refers to a component located at a shoulder portion between a tread and a sidewall. Specifically, it is a component as shown in, for example, FIGS. 1 and 3 of JP 2007-176267 A.

The pneumatic tire of the present invention can be formed from the rubber composition by usual methods. Specifically, an unvulcanized rubber composition containing the above-described components is extruded and processed into the shape of a sidewall, a clinch, a wing, or other tire components, and then assembled with other tire components in a usual manner on a tire building machine to build an unvulcanized tire. The unvulcanized tire is heated and pressurized in a vulcanizer to produce a tire.

The pneumatic tire of the present invention can be used as, for example, a tire for passenger vehicles, a tire for trucks and buses, a tire for two-wheeled vehicles, or a high performance tire. The term "high performance tire" herein refers to a tire excellent particularly in grip performance, and conceptually includes racing tires for use in racing vehicles.

EXAMPLES

The present invention will be specifically described with reference to, but not limited to, examples.

The chemicals used in examples and comparative examples are listed below.

TABLE 1

| | |
|---|---|
| NR | RSS#3 |
| IR | IR2200 available from Zeon Corporation |
| BR 1 | BR150B (cis content: 97% by mass) available from Ube Industries, Ltd. |
| BR 2 | VCR412 (polybutadiene rubber containing 1,2-syndiotactic polybutadiene crystals (SPB-containing BR), 1,2-syndiotactic polybutadiene crystal content: 12% by mass) available from Ube Industries, Ltd. |
| EPDM | Esprene 505 (ethylene-propylene-diene rubber) available from Sumitomo Chemical Co., Ltd. |
| IIR | Butyl 065 (non-halogenated butyl rubber, isoprene content: 1.05 mol %) available from Exxon Mobil Corporation |
| Carbon black | Shoblack N330 ($N_2SA$: 75 $m^2/g$, DBP: 102 mL/100 g) available from Cabot Japan K. K. |
| Silica | Ultrasil $VN_3$ ($N_2SA$: 175 $m^2/g$) available from Evonik Degussa |
| Wax | Sunnoc wax available from Ouchi Shinko Chemical Industrial Co., Ltd. |
| Oil | Process oil PW-32 (paraffinic process oil) available from Idemitsu Kosan Co., Ltd. |
| Polyether 1 | Polyether produced in the Production Example 1 below (polybutylene glycol) |
| Polyether 2 | Polyether produced in the Production Example 2 below (polyoxyethylene stearyl alcohol, alkylene oxide AO:EO, number of EO units added (n): 80) |

TABLE 1-continued

| | |
|---|---|
| Polyether 3 | Newpol LB-1715 (polyoxypropylene butyl ether, number of PO units added (n): 40) available from Sanyo Chemical Industries, Ltd. |
| Polyether 4 | Newpol LB-65 (polyoxypropylene butyl ether, number of PO units added (n): 5) available from Sanyo Chemical Industries, Ltd. |
| Polyether 5 | Newpol PE-64 (Pluronic nonionic surfactant (PEG/PPG-25/30 copolymer)) available from Sanyo Chemical Industries, Ltd. |
| Polyether 6 | PEG-4000N (polyethylene glycol) available from Sanyo Chemical Industries, Ltd. |
| Polyether 7 | Ionet T-80V (polyoxyethylene sorbitan monooleate) available from Sanyo Chemical Industries, Ltd. |
| Polyether 8 | Ionet T-60V (polyoxyethylene sorbitan monostearate) available from Sanyo Chemical Industries, Ltd. |
| Antioxidant 1 | Nocrac 6C (N-(1,3-dimethylbutyl)-N'-phenyl-p-phenylenediamine) available from Ouchi Shinko Chemical Industrial Co., Ltd. |
| Antioxidant 2 | Nocrac 224 (2,2,4-trimethyl-1,2-dihydroquinoline polymer) available from Ouchi Shinko Chemical Industrial Co., Ltd. |
| Stearic acid | Stearic acid available from NOF Corporation |
| Sulfur | Powdered sulfur available from Tsurumi Chemical Industry Co., Ltd. |
| Zinc oxide | Zinc oxide #1 available from Mitsui Mining and Smelting Co., Ltd. |
| Vulcanization accelerator | Nocceler NS (N-tert-butyl-2-benzothiazolyl sulfenamide) available from Ouchi Shinko Chemical Industrial Co., Ltd. |

Production Example 1: Production of Polyether 1

Into a pressure-resistant reaction vessel equipped with a thermometer, a heating/cooling system, a stirrer, and a dropping gas cylinder were introduced 90 parts of 1,2-butanediol (Wako Pure Chemical Industries, Ltd.) and six parts of potassium hydroxide (Tokyo Chemical Industry Co., Ltd.). After purging with nitrogen, the reaction vessel was sealed and heated to 140° C. The mixture was put under reduced pressure at 140° C. with stirring to remove two parts of water. Then, 2,910 parts of 1,2-butylene oxide (Tokyo Chemical Industry Co., Ltd.) was dropwise added over ten hours while adjusting the pressure to 0.5 MPa or lower, and the mixture was aged for five hours at the same temperature. After cooling to 60° C., six parts of acetic acid was introduced and stirred at 60° C. for 30 minutes to give 3,010 parts of polybutylene glycol. The polybutylene glycol had a hydroxyl value of 37.4 as measured according to the neutralization titration method specified in JIS K 0070, and also had a number average molecular weight of 3,000.

Production Example 2: Production of Polyether 2

Into a pressure-resistant reaction vessel equipped with a thermometer, a heating/cooling system, a stirrer, and a dropping gas cylinder were introduced 270 parts of stearyl alcohol and six parts of potassium hydroxide. After purging with nitrogen, the reaction vessel was sealed and heated to 140° C. The mixture was put under reduced pressure at 140° C. with stirring to remove two parts of water. Then, 3,520 parts of ethylene oxide was dropwise added over eight hours while adjusting the pressure to 0.5 MPa or lower, and the mixture was aged for two hours at the same temperature. After cooling to 60° C., six parts of acetic acid was introduced and stirred at 60° C. for 30 minutes to give 3,800 parts of polyoxyethylene stearyl alcohol. The polyoxyethylene stearyl alcohol had a hydroxyl value of 14.8 as measured according to the neutralization titration method specified in JIS K 0070, and also had a number average molecular weight of 3,790.

Table 2 shows the properties of Polyethers 1 to 8 used.

TABLE 2

| | HLB (Oda's method) | Glycol ether content | Number average molecular weight | Number of hydroxyl groups |
|---|---|---|---|---|
| Polyether 1 (Production Example 1) | 3.5 | 100 | 3000 | 2 |
| Polyether 2 (Production Example 2) | 17.1 | 93 | 3790 | 1 |
| Polyether 3 (Newpol LB-1715) | 4.3 | 98 | 2400 | 1 |
| Polyether 4 (Newpol LB-65) | 6.2 | 83 | 340 | 1 |
| Polyether 5 (Newpol PE-64) | 9.9 | 100 | 2850 | 2 |
| Polyether 6 (PEG-4000N) | 19.5 | 100 | 3100 | 2 |
| Polyether 7 (Ionet T-80V) | 15.0 | 68 | 1300 | 3 |
| Polyether 8 (Ionet T-60V) | 10.3 | 67 | 1300 | 3 |

According to each of the formulations shown in Tables 3 to 5, the chemicals other than the sulfur and vulcanization accelerator were kneaded using a 1.7 L Banbury mixer until the temperature of the mixture reached 180° C. Next, the sulfur and vulcanization accelerator were added to the kneaded mixture and they were kneaded using an open roll mill until the temperature of the mixture reached 105° C. to obtain an unvulcanized rubber composition. The unvulcanized rubber composition was then press-vulcanized at 160° C. for 15 minutes to obtain a vulcanized rubber composition.

The vulcanized rubber compositions prepared as above were evaluated as described below. Tables 3 to 5 show the results. Comparative Examples 1, 7, and 12 are taken as the reference comparative examples in Tables 3, 4, and 5, respectively.

<Evaluation of Ozone Resistance>

A test piece with a predetermined size was prepared from each of the prepared vulcanized rubber compositions and subjected to a dynamic ozone deterioration test in conformity with JIS K 6259 "Rubber, vulcanized or thermoplastics—Determination of ozone resistance". The test was carried out for 48 hours at a frequency of reciprocation of 0.5±0.025 Hz, an ozone concentration of 50±5 pphm, a test temperature of 40° C., and a tensile strain of 20±2%. After the test, crack conditions (the presence or absence of cracks) were analyzed to evaluate ozone resistance. A higher index indicates a smaller number of cracks and a smaller size of crack, and therefore better ozone resistance.

<Evaluation of Discoloration Resistance>

The samples after the ozone resistance test were analyzed with a chromameter (CR-310) available from Konica Minolta, Inc. to determine "a" and "b" values (L*a*b* color system). The value of (a2+b2)−0.5 was used as a parameter and expressed as an index calculated from the formula: (parameter of each formulation example)/(parameter of reference comparative example)×100, with the reference comparative example set equal to 100. A higher index indicates less discoloration and therefore better discoloration resistance.

<Evaluation of Appearance>

The appearance of the samples after the ozone resistance test was evaluated in an open air based on the following criteria.

AA: Darker black than reference comparative example and shiny
A: Darker black than reference comparative example and slightly shiny
B: Similar shade of brown as reference comparative example
C: Darker brown than reference comparative example

TABLE 3

| | | Example | | | | | | | Comparative Example | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| Formulation (parts by mass) | NR (RSS#3) | 43 | 43 | 43 | 43 | 43 | 38 | 38 | 43 | 43 | 43 | 43 | 43 | 43 |
| | BR 1 (BR150B) | 57 | 57 | 57 | 57 | 57 | 50 | 50 | 57 | 57 | 57 | 57 | 57 | 57 |
| | EPDM (Esprene 505) | — | — | — | — | — | 12 | — | — | — | — | — | — | — |
| | IIR (Butyl 065) | — | — | — | — | — | — | 12 | — | — | — | — | — | — |
| | Carbon black (N330) | 60 | 60 | 60 | 60 | 60 | 60 | 60 | 60 | 60 | 60 | 60 | 61 | 60 |
| | Wax (Sunnoc wax) | 1.5 | 1.5 | 1.5 | 1.5 | 1.5 | 1.5 | 1.5 | 1.5 | 1.5 | 1.5 | 1.5 | 1.5 | 1.5 |
| | Oil (Process oil PW-32) | 4.7 | 4.7 | 4.7 | 4.7 | — | 4.7 | 4.7 | 4.7 | 4.7 | 4.7 | 4.7 | — | — |
| | Polyether 1 (Production Example 1) | 1.3 | — | — | — | 6.0 | — | — | — | — | — | — | — | — |
| | Polyether 2 (Production Example 2) | — | 1.3 | — | — | — | 1.3 | — | — | — | — | — | — | — |
| | Polyether 3 (Newpol LB-1715) | — | — | 1.3 | — | — | — | 1.3 | — | — | — | — | — | — |
| | Polyether 4 (Newpol LB-65) | — | — | — | 1.3 | — | — | — | — | — | — | — | 10 | — |
| | Polyether 5 (Newpol PE-64) | — | — | — | — | — | — | — | 1.3 | — | — | — | — | — |
| | Polyether 6 (PEG-4000N) | — | — | — | — | — | — | — | — | 1.3 | — | — | — | 6 |
| | Polyether 7 (Ionet T-80V) | — | — | — | — | — | — | — | — | — | 1.3 | — | — | — |
| | Polyether 8 (Ionet T-60V) | — | — | — | — | — | — | — | — | — | — | 1.3 | — | — |
| | Antioxidant 1 (Nocrac 6C) | 2.6 | 2.6 | 2.6 | 2.6 | 2.6 | 2.3 | 2.3 | 2.6 | 2.6 | 2.6 | 2.6 | 2.6 | 2.6 |
| | Stearic acid | 2.0 | 2.0 | 2.0 | 2.0 | 2.0 | 2.0 | 2.0 | 2.0 | 2.0 | 2.0 | 2.0 | 2.0 | 2.0 |
| | Sulfur (powdered sulfur) | 1.5 | 1.5 | 1.5 | 1.5 | 1.5 | 1.5 | 1.5 | 1.5 | 1.5 | 1.5 | 1.5 | 1.5 | 1.5 |
| | Zinc oxide (zinc oxide #1) | 2.2 | 2.2 | 2.2 | 2.2 | 2.2 | 2.2 | 2.2 | 2.2 | 2.2 | 2.2 | 2.2 | 2.2 | 2.2 |
| | Vulcanization accelerator (Nocceler NS) | 1.0 | 1.0 | 1.0 | 1.0 | 1.0 | 1.0 | 1.0 | 1.0 | 1.0 | 1.0 | 1.0 | 1.0 | 1.0 |
| Evaluation | Ozone resistance | 101 | 101 | 101 | 103 | 104 | 104 | 105 | 100 | 99 | 101 | 101 | 102 | 102 |
| | Discoloration resistance | 101 | 103 | 102 | 102 | 100 | 103 | 104 | 100 | 98 | 97 | 96 | 98 | 98 |
| | Appearance | B | B | A | A | B | B | A | B | B | C | C | C | C |

TABLE 4

| | | Example | | | | | Comparative Example | | | | |
|---|---|---|---|---|---|---|---|---|---|---|---|
| | | 8 | 9 | 10 | 11 | 12 | 7 | 8 | 9 | 10 | 11 |
| Formulation (parts by mass) | NR (RSS#3) | 50 | 50 | 50 | 50 | 50 | 50 | 50 | 50 | 50 | 50 |
| | BR 1 (BR150B) | 27 | 27 | 27 | 27 | 27 | 27 | 27 | 27 | 27 | 27 |
| | BR 2 (VCR412) | 23 | 23 | 23 | 23 | 23 | 23 | 23 | 23 | 23 | 23 |
| | Carbon black (N330) | 38 | 38 | 38 | 38 | 38 | 38 | 38 | 38 | 38 | 38 |
| | Wax (Sunnoc wax) | 1.5 | 1.5 | 1.5 | 1.5 | 1.5 | 1.5 | 1.5 | 1.5 | 1.5 | 1.5 |
| | Oil (Process oil PW-32) | 6.0 | 6.0 | 6.0 | 6.0 | 1.5 | 6.0 | 6.0 | 6.0 | 6.0 | 1.5 |
| | Polyether 1 (Production Example 1) | 1.5 | — | — | — | — | — | — | — | — | — |
| | Polyether 2 (Production Example 2) | — | 1.5 | — | — | — | — | — | — | — | — |
| | Polyether 3 (Newpol LB-1715) | — | — | 1.5 | — | 6.0 | — | — | — | — | — |
| | Polyether 4 (Newpol LB-65) | — | — | — | 1.5 | — | — | — | — | — | — |
| | Polyether 5 (Newpol PE-64) | — | — | — | — | — | 1.5 | — | — | — | — |
| | Polyether 6 (PEG-4000N) | — | — | — | — | — | — | 1.5 | — | — | 6.0 |
| | Polyether 7 (Ionet T-80V) | — | — | — | — | — | — | — | 1.5 | — | — |
| | Polyether 8 (Ionet T-60V) | — | — | — | — | — | — | — | — | 1.5 | — |
| | Antioxidant 1 (Nocrac 6C) | 2.8 | 2.8 | 2.8 | 2.8 | 2.8 | 2.8 | 2.8 | 2.8 | 2.8 | 2.8 |
| | Antioxidant 2 (Nocrac 224) | 0.5 | 0.5 | 0.5 | 0.5 | 0.5 | 0.5 | 0.5 | 0.5 | 0.5 | 0.5 |
| | Stearic acid | 2.0 | 2.0 | 2.0 | 2.0 | 2.0 | 2.0 | 2.0 | 2.0 | 2.0 | 2.0 |
| | Sulfur (powdered sulfur) | 2.1 | 2.1 | 2.1 | 2.1 | 2.1 | 2.1 | 2.1 | 2.1 | 2.1 | 2.1 |
| | Zinc oxide (zinc oxide #1) | 3.7 | 3.7 | 3.7 | 3.7 | 3.7 | 3.7 | 3.7 | 3.7 | 3.7 | 3.7 |
| | Vulcanization accelerator (Nocceler NS) | 0.8 | 0.8 | 0.8 | 0.8 | 0.8 | 0.8 | 0.8 | 0.8 | 0.8 | 0.8 |
| Evaluation | Ozone resistance | 102 | 102 | 101 | 102 | 105 | 100 | 100 | 101 | 102 | 104 |
| | Discoloration resistance | 100 | 103 | 103 | 102 | 100 | 100 | 99 | 98 | 98 | 96 |
| | Appearance | A | B | A | A | B | B | B | C | C | B |

TABLE 5

|  |  | Example | | Comparative Example |
|---|---|---|---|---|
|  |  | 13 | 14 | 12 |
| Formulation (parts by mass) | NR (RSS#3) | 30 | 30 | 30 |
|  | IR (IR2200) | 8 | 8 | 8 |
|  | BR 1 (BR150B) | 45 | 45 | 45 |
|  | EPDM (Esprene 505) | 17 | 17 | 17 |
|  | Carbon black (N330) | 62 | 62 | 62 |
|  | Wax (Sunnoc wax) | 1.5 | 1.5 | 1.5 |
|  | Oil (Process oil PW-32) | 6.0 | 6.0 | 6.0 |
|  | Polyether 2 (Production Example 2) | 0.2 | — | — |
|  | Polyether 4 (Newpol LB-65) | — | 0.2 | — |
|  | Antioxidant 1 (Nocrac 6C) | 0.5 | 0.5 | 0.5 |
|  | Stearic acid | 2.0 | 2.0 | 2.0 |
|  | Sulfur (powdered sulfur) | 1.5 | 1.5 | 1.5 |
|  | Zinc oxide (zinc oxide #1) | 2.2 | 2.2 | 2.2 |
|  | Vulcanization accelerator (Nocceler NS) | 1.0 | 1.0 | 1.0 |
| Evaluation | Ozone resistance | 100 | 100 | 100 |
|  | Discoloration resistance | 101 | 101 | 100 |
|  | Appearance | B | B | C |

TABLE 6

|  |  | Example | | Comparative Example |
|---|---|---|---|---|
|  |  | 15 | 16 | 13 |
| Formulation (parts by mass) | NR (RSS#3) | 43 | 43 | 43 |
|  | BR 1 (BR150B) | 57 | 57 | 57 |
|  | Carbon black (N330) | 50 | 50 | 50 |
|  | Silica (Ultrasil VN$_3$) | 15 | 15 | 15 |
|  | Wax (Sunnoc wax) | 1.5 | 1.5 | 1.5 |
|  | Oil (Process oil PW-32) | 4.7 | 4.7 | 4.7 |
|  | Polyether 2 (Production Example 2) | 1.3 | — | — |
|  | Polyether 4 (Newpol LB-65) | — | 1.3 | — |
|  | Polyether 5 (Newpol PE-64) | — | — | 1.3 |
|  | Antioxidant 1 (Nocrac 6C) | 2.6 | 2.6 | 2.6 |
|  | Stearic acid | 2.0 | 2.0 | 2.0 |
|  | Sulfur (powdered sulfur) | 1.5 | 1.5 | 1.5 |
|  | Zinc oxide (zinc oxide #1) | 2.2 | 2.2 | 2.2 |
|  | Vulcanization accelerator (Nocceler NS) | 1.0 | 1.0 | 1.0 |
| Evaluation | Ozone resistance | 103 | 104 | 100 |
|  | Discoloration resistance | 104 | 101 | 100 |
|  | Appearance | B | A | B |

Crack resistance, ozone resistance, discoloration resistance, and tire appearance were improved while maintaining a good balance between them in the examples in which the rubber composition contained a rubber component having a combined content of polybutadiene rubber, natural rubber, and polyisoprene rubber of 80% by mass or more per 100% by mass of the rubber component, and the rubber composition contained, per 100 parts by mass of the rubber component: 0.1 to 8.0 parts by mass of polyether (A) having a glycol ether content of 80% by mass or more and a HLB of 3.5 to 19.0 (excluding Pluronic nonionic surfactants); 2 to 70 parts by mass of carbon black; and 0.3 to 7.0 parts by mass of an antioxidant.

The invention claimed is:

1. A pneumatic tire, comprising a tire component, said tire component being formed from a rubber composition, said rubber composition comprising a rubber component having a combined content of polybutadiene rubber, natural rubber, and polyisoprene rubber of 80% by mass or more per 100% by mass of the rubber component, the rubber composition comprising, per 100 parts by mass of the rubber component:

0.1 to 8.0 parts by mass of a polyether (A) having a glycol ether content of 80% by mass or more and a HLB of 3.5 to 19.0, the polyether (A) excluding Pluronic nonionic surfactants;

2 to 70 parts by mass of carbon black; and 0.3 to 7.0 parts by mass of an antioxidant, wherein the polyether (A) is represented by $R^1$—O—$(R^2$—O$)_n$—$R^3$ or $R^4$—$\{$O—$(R^2$—O$)_n$—$R^1\}_m$, wherein $R^1$ represents a hydrogen atom;

wherein each $R^2$ is the same as or different from each other and represents a C2-C10 divalent aliphatic hydrocarbon or divalent alicyclic hydrocarbon group in which a hydrogen atom bound to a carbon atom is optionally replaced with an aromatic hydrocarbon group;

wherein $R^3$ represents a C1-C20 aliphatic hydrocarbon, alicyclic hydrocarbon, aromatic hydrocarbon, or alkanoyl group in which a hydrogen atom bound to a carbon atom is optionally replaced with an aromatic hydrocarbon group;

wherein $R^4$ represents a residue that is compound (a) having three or more hydroxyl groups from which the hydroxyl groups are removed; and wherein n and m represent integers which are not limited as long as the HLB and the glycol ether content fall within the respective ranges indicated above.

2. The pneumatic tire according to claim 1,
wherein the polyether (A) has a number average molecular weight of 1,500 to 50,000.

3. The pneumatic tire according to claim 1,
wherein the polyether (A) has a HLB of 4.0 to 17.5.

4. The pneumatic tire according to claim 1,
wherein the polyether (A) has a number average molecular weight of 2,000 to 40,000.

5. The pneumatic tire according to claim 1,
wherein the tire component is at least one of a sidewall, clinch, or wing.

6. The pneumatic tire according to claim 2,
wherein the polyether (A) has a HLB of 4.0 to 17.5.

7. The pneumatic tire according to claim 2,
wherein the polyether (A) has a number average molecular weight of 2,000 to 40,000.

8. The pneumatic tire according to claim 3,
wherein the polyether (A) has a number average molecular weight of 2,000 to 40,000.

\* \* \* \* \*